– – –

United States Patent [19]

Kreft et al.

[11] 4,309,900

[45] Jan. 12, 1982

[54] APPARATUS FOR MEASUREMENT AND DISPLAY OF RELATIVE COMPRESSION BY CYLINDER

[75] Inventors: Keith A. Kreft, Mt. Prospect; Alan E. Rossetti, Glenview; Michael F. Lynn, Berwyn, all of Ill.

[73] Assignee: Sun Electric Corporation, Crystal Lake, Ill.

[21] Appl. No.: 141,668

[22] Filed: Apr. 18, 1980

[51] Int. Cl.³ ............................................ G01M 15/00
[52] U.S. Cl. .................................................. 73/117.2
[58] Field of Search ................ 73/117.2, 116; 364/551

[56] References Cited

U.S. PATENT DOCUMENTS

| | | | |
|---|---|---|---|
| 3,713,331 | 1/1973 | Petersen et al. | 73/117.2 |
| 4,050,297 | 9/1977 | Pettingell et al. | 73/117.2 |
| 4,062,232 | 12/1977 | Sutphin, Jr. | 73/117.2 |

Primary Examiner—Jerry W. Myracle
Attorney, Agent, or Firm—Allegretti, Newitt, Witcoff & McAndrews

[57] ABSTRACT

An engine tester for determining relative compression by cylinder is disclosed. The tester includes a processor which samples starter current in response to input signals based upon engine cylinder firings. The processor correlates the starter current data and the input signals to identify the current by cylinder.

16 Claims, 6 Drawing Figures

(ENGINE SIGNAL TIMING)

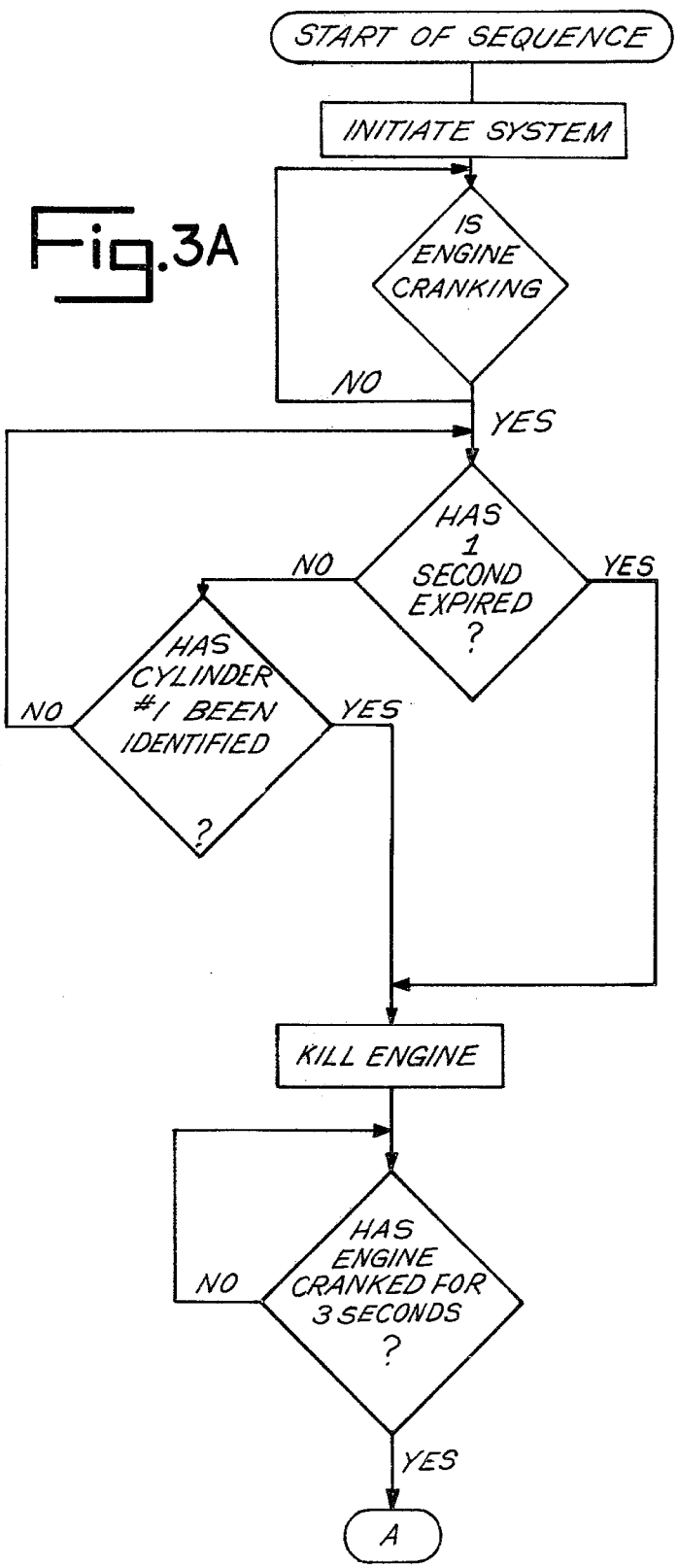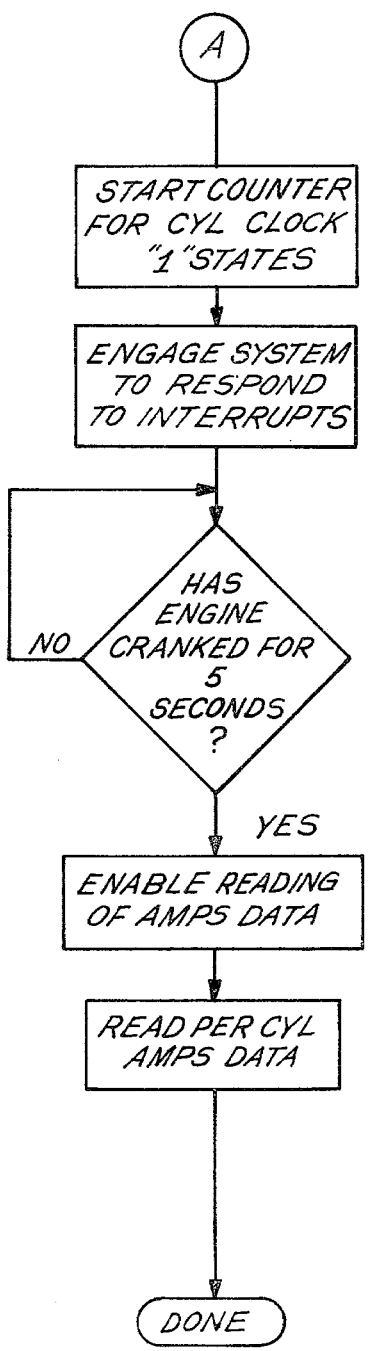

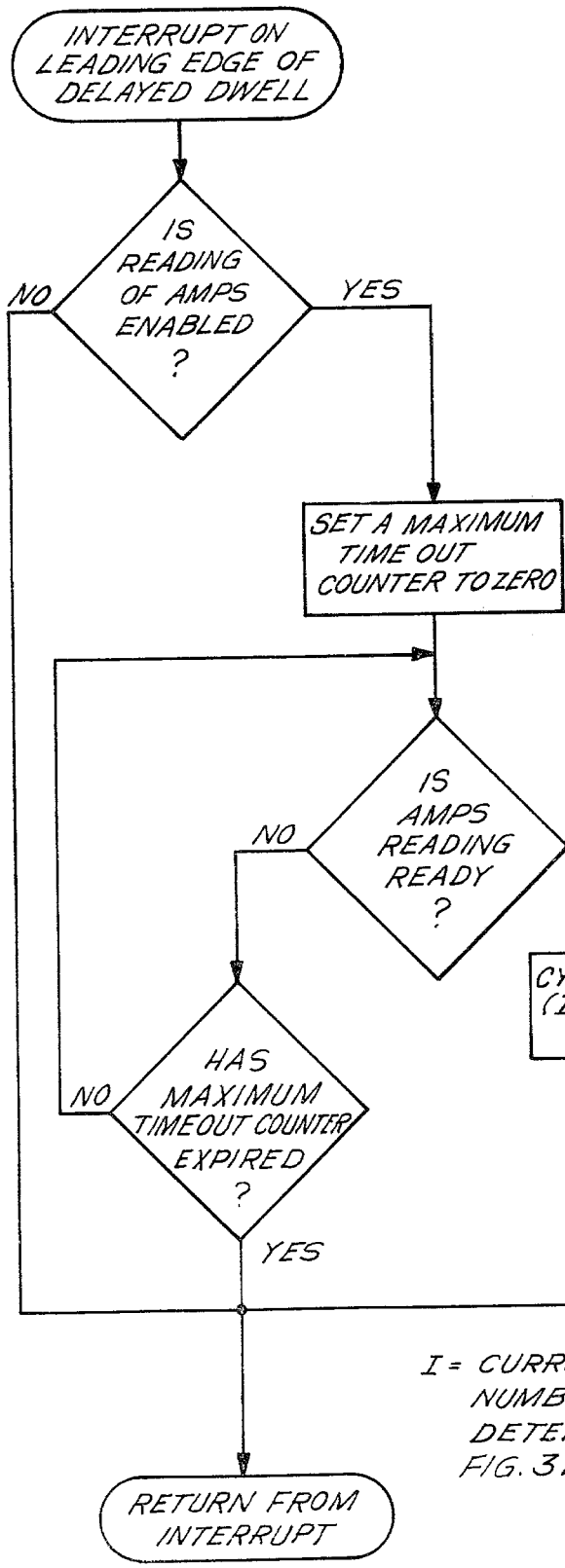
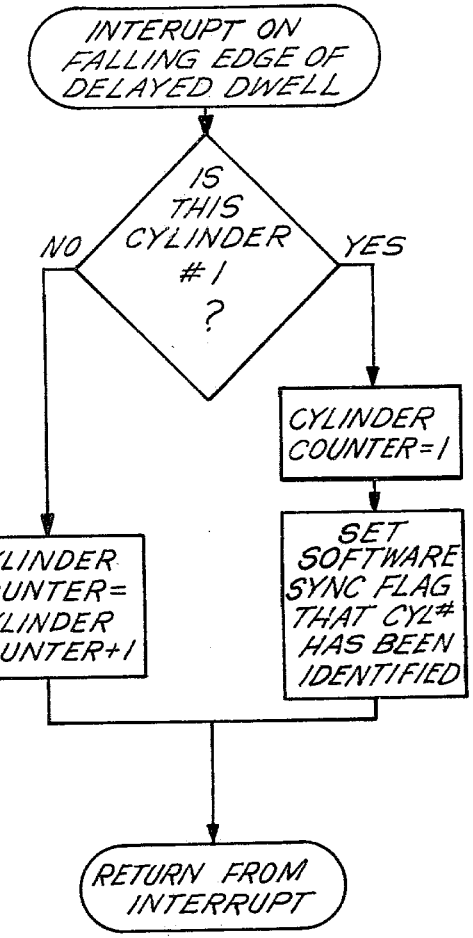
I = CURRENT CYLINDER NUMBER AS DETERMINED BY FIG. 3D ROUTINE

APPARATUS FOR MEASUREMENT AND DISPLAY OF RELATIVE COMPRESSION BY CYLINDER

BACKGROUND OF THE INVENTION

The present invention relates generally to an electronic engine tester and more particularly to an engine tester for determination and display of relative compression on a per cylinder basis.

It is well known in the art that relative compression is related to the current drawn by the starter motor during cranking. Essentially, current draw is representative of compression, as the starter motor requires more current to compress a well sealed cylinder than a poorly sealed cylinder.

There are presently available numerous relative compression measurement systems wherein starter current is monitored. One such system is described, in great detail, in U.S. Pat. No. 4,027,532, and the teachings thereof are incorporated herein by reference. The teachings of a related U.S. Pat. No. 4,125,894, are also incorporated herein as illustrating the sophisticated state of the art with respect to electronic engine testers. The present application and the incorporated patents are assigned to the Sun Electric Corporation of Chicago, Ill. (hereinafter "Sun Electric").

Unfortunately, the presently available systems do not display relative compression by cylinder. Although a per cylinder reading may be made and displayed, there is no correlation between the specific cylinders and the readings, such that additional tests and/or measurements must be performed to identify the problem cylinder.

SUMMARY OF THE PRESENT INVENTION

In a principal aspect, the present invention is a test apparatus for measuring and displaying, by cylinder, the relative compression of an internal combustion engine. The test apparatus includes an input system, an engine kill system, a sample system, a processor and a display.

In operation, the input system provides two signals to the processor. These signals are a CYL CLOCK signal, representative of the primary coil signal and therefore each cylinder firing, and a CYLINDER #1 signal, representative of the secondary coil signal for cylinder #1 and therefore the firing of cylinder #1.

At a given time after cranking is begun, the processor activates the engine kill system to avoid the starting of the engine. The engine kill system responsively loads the primary coil such that cylinder firing is effectively eliminated, without effecting production of the CYL CLOCK signal by the input system. Activation is maintained for a determined period.

After activating the engine kill system, the processor intermittently samples the starter current through the sample system. Sampling is timed in accordance with the CYL CLOCK signal received from the input system.

The processor then generates an OUTPUT signal received by the display. With the data from the input system, the processor correlates cylinder identification and starter current in the OUTPUT signal.

In response thereto, the display shows a series of cylinder-identifying symbols and respective relative compression symbols. In one preferred embodiment, the cylinders are shown vertically in firing order and the sampled starter currents are displayed, in amperes, aligned therewith.

In another aspect, the present invention is an improved apparatus and method for sampling starter current during a relative compression test. The starter current is sampled in timed relationship to cylinder firing. More particularly, sampling occurs a predetermined period of time after opening of the ignition points.

It is thus an object of the present invention to provide an improved relative compression system wherein compression is measured and displayed by cylinder. Another object is a relative compression tester wherein the troublesome cylinder is immediately identified by a single test operation.

Still another object is an improved relative compression test apparatus wherein a reference cylinder, or cylinder #1, is identified and current draw data is correlated therewith such that cylinder identification and the current draw data are correspondingly displayed. It is also an object of the present invention to provide an improved relative compression tester wherein sampling of the starter current is timed in accordance with engine firing, as opposed to cylinder position, e.g., top dead center.

A further object is an apparatus for sampling starter current to determine relative compression wherein sampling is performed a predetermined time after cylinder firing, i.e., a predetermined time after opening of the ignition points. Still another object of the present invention is a reliable electronic relative compression test apparatus, which substantially minimizes processor time in the collection of data.

These and other features, objects and advantages of the present invention are set forth or implied in the following detailed description.

BRIEF DESCRIPTION OF THE DRAWING

A preferred embodiment of the present invention as described in the next section with reference to the drawing herein:

FIGS. 3A–3D is a flow chart illustrating operation of the processor shown in FIG. 1.

DESCRIPTION OF A PREFERRED EMBODIMENT

Figure 1:
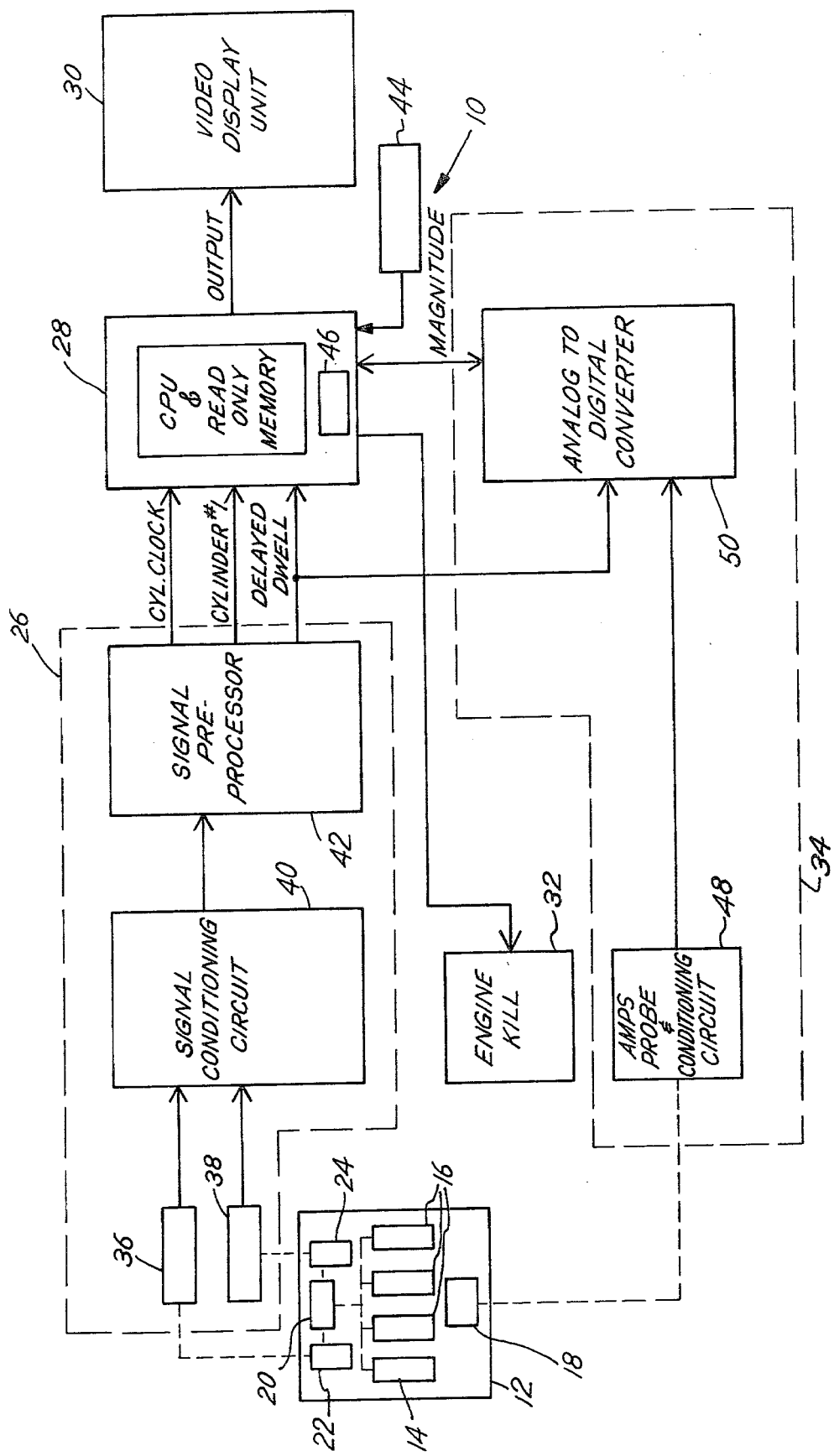
FIG. 1 is a schematic block diagram of a preferred embodiment.
Figure 2:
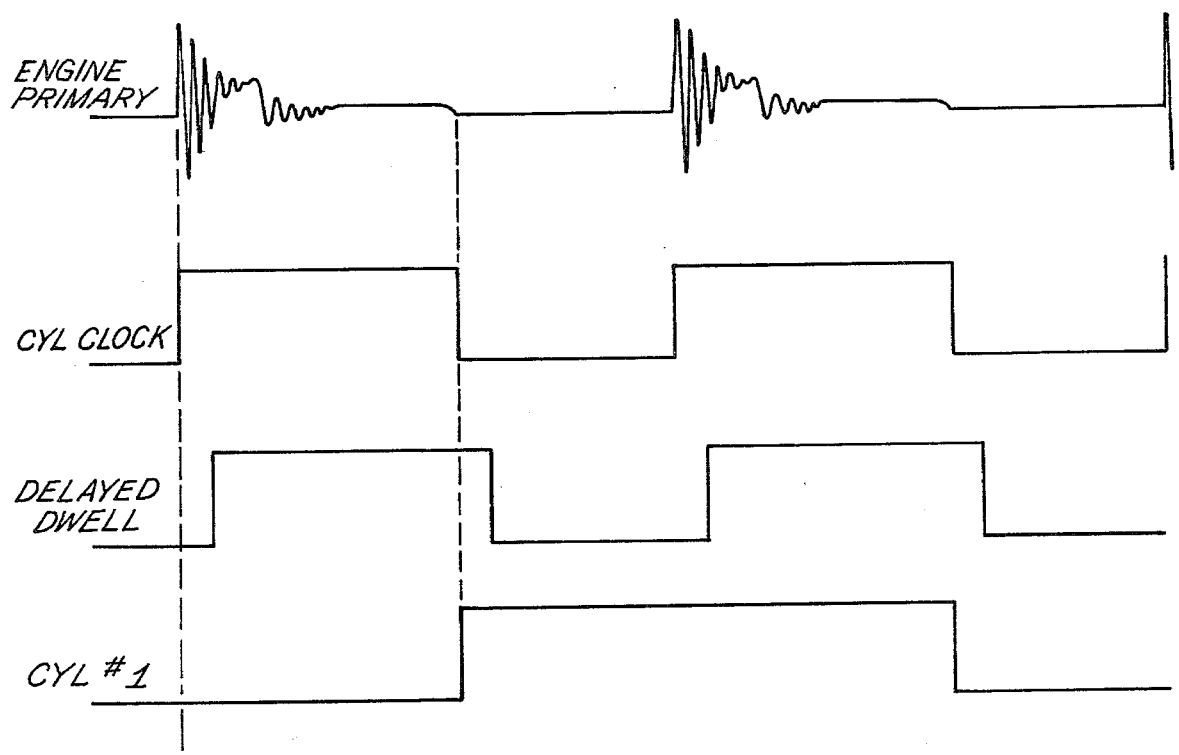
FIG. 2 illustrates various signals utilized and produced by the preferred embodiment of FIG. 1.

Referring to FIGS. 1–3, a preferred embodiment of the present invention is shown as a test apparatus 10. The test apparatus 10 measures and displays the relative compression of an internal combustion engine 12 by cylinder. In this preferred embodiment, and merely as an illustration, the engine 12 is a four cylinder, four cycle engine, having a reference cylinder 14 or cylinder #1, additional cylinders 16, a starter 18, and a distributor system 20 including a primary coil 22 and a secondary coil 24.

Measurement and display of current draw by cylinder means that the current draw data is correlated with respect to the individual cylinders 14, 16 of the engine 12 and correspondingly displayed. Correlation is based upon an identification of the reference cylinder 14, i.e., cylinder #1.

The test apparatus 10 includes input means 26, processor means 28, display means 30, engine kill means 32 and sample means 34, interconnected as shown. In this preferred embodiment, the input means 24 includes a primary pick-up 36, a cylinder #1 pick-up 38, a signal conditioning circuit 40 and a signal pre-processor 42.

The pick-ups 36, 38 are coupled to the primary coil 22 and the secondary coil lead of cylinder #1 (not shown), respectively. The analog signals produced by the pick-ups 36, 38 are filtered and conditioned in the signal conditioning circuit 40 to suppress extraneous noise.

The signal pre-processor 42 receives the conditioned signals and responsively provides a CYL CLOCK signal, a CYLINDER #1 signal and a DELAYED DWELL signal, as shown in FIG. 2. In this preferred embodiment, the signal pre-processor 42 is a programmed microprocessor, such as a Motorola 6802 microprocessor. A purely hardware embodiment thereof to generate the CYL CLOCK, CYLINDER #1 and DELAYED DWELL signals is shown in the incorporated U.S. Pat. No. 4,125,894. The microprocessor signal pre-processor 42 is presently utilized in the "1215" and "2011" testers manufactured and sold by Sun Electric, bearing Board No. 7001-120.

The CYL CLOCK signal is a digital signal including a series of high or "1" state pulses. The leading edge of each "1" state pulse corresponds with the opening of the ignition points (not shown). The duration of the CYL CLOCK signal "1" state is variable depending upon engine speed and returns to a low or "0" state prior to points opening for the next cylinder period. "Points opening" is used herein in reference to a mechanical ignition system, however, as will suggest itself, a semiconductor ignition system may be utilized. Thus, the CYL CLOCK signal is related to and represents the firing of the cylinders 14, 16 in the engine 12.

The CYLINDER #1 signal is also a digital signal and represents the firing of cylinder #1. Referring to FIG. 2, the "1" state of the CYLINDER #1 signal overlaps in time with one of the "1" states of the CYL CLOCK signal and identifies that CYL CLOCK "1" state as corresponding to or correlated with cylinder #1.

The DELAYED DWELL signal is the CYL CLOCK signal delayed a predetermined time. The preferred delay is in the order of 700 microseconds. The delay shown in FIG. 2 is exaggerated for clarity.

The signal pre-processor 42 receives the conditioned signal from the cylinder #1 pick-up 38, monitors the conditioned signal from the primary pick-up 36 and predicts which primary signal corresponds to cylinder #1. Verification is made by comparison of the signal from the primary pick-up 36 and the signal from the cylinder #1 pick-up 38 over at least one complete cycle of the engine 12.

The CYL CLOCK and CYLINDER #1 signals are received by the processor means 28, preferably a National Semiconductor "PACE" microprocessor. After manual initiation of the relative compression test, the processor means 28 monitors starter current draw through the sample means 34 for initiation of cranking. The processor means 28 activates or enables the engine kill means 32 at a predetermined time after cranking is begun. In this preferred embodiment, enabling of the engine kill means 32 occurs one second thereafter.

Once enabled, the engine kill means 32 loads the primary coil 22 to effectively prohibit any firing of the secondary coil 24, and the engine 12 will not start. Although the cylinder #1 pick-up 38 ceases to provide any input signal to the signal conditioning circuit 40, the signal pre-processor 42 continues to provide the CYL-INDER #1 signal. Production by the primary pick-up 36 continues uninterrupted, as the primary coil 22 is loaded but not shorted.

The one second delay in enabling the engine kill means 32 permits approximately three or four revolutions of the engine 12 with firing of the secondary coil 24. In the vast majority of cases, this delay is ample time for the signal pre-processor 42 to verify correspondence between the CYL CLOCK and CYLINDER #1 signals.

This one second also represents the maximum verification period. If verification is accomplished during the one second period, then the signal pre-processor 42 signals the processor means 28 and the test shifts to the next phase. If the one second maximum is reached without verification, then a shift to the next phase is automatically made and the signal pre-processor 42 generates a NO signal, received and stored by the processor means 28, indicating lack of verification.

Prior to enabling of the engine kill means 32, the processor means 28 stores the correlation or correspondence between the CYL CLOCK signal and the CYLINDER #1 signal, i.e., the identification of which "1" state of the CYL CLOCK signal relates to cylinder #1. In this preferred embodiment, the processor means 28 includes parameter means 44 for inputting the number of cylinders 14, 16 in the engine 12 and counter means 46 for counting the number of "1" states of the CYL CLOCK signal.

The sample means 34 is coupled to the starter motor 18 of the engine 12 and monitors the current drawn thereby. The output of the sample means 34 is a MAGNITUDE signal in digital format representing the magnitude of the starter current.

In this preferred embodiment, the sample means 34 includes an amps probe and conditioning circuit 48, coupled to the starter 18, and an analog-to-digital converter 50. To receive the MAGNITUDE signal, the processor means 28 addresses the converter 50 in timed sequence with the DELAYED DWELL signal. The converter 50 is additionally triggered by the DELAYED DWELL signal such that the MAGNITUDE signal is available to the processor means 28 when requested.

In accordance with the DELAYED DWELL signal, and thus a predetermined time after each cylinder firing, the processor means 28 intermittently samples the starter current by receiving the MAGNITUDE signal. Sampling preferably occurs 700 microseconds after firing, i.e., 700 microseconds after the ignition points open as established by the leading edge of the DELAYED DWELL signal.

This sampling procedure, based upon ignition timing and delayed with respect to the opening of the ignition points, substantially avoids peak detection in the starter current and the error often arising therewith. Further, the delay permits ringing, sensed by the amps probe 48 as a result of the high ignition voltages, to substantially decay, whereby a more reliable measurement of starter current is made. Uniformity in data is also achieved since measurement or sampling is performed at substantially the same point of the cylinder cycle, i.e., a predetermined time after cylinder firing. In addition, the leading edge of the DELAYED DWELL signal serves as an interrupt to CPU 28, permitting the CPU to perform other tasks without having to continually look for the leading edge of the DELAYED DWELL signal.

The processor means 28 delays initiation of the sampling sequence for a predetermined amount of time after enabling the engine kill means 32. This time is preferably two seconds, i.e., three seconds from initiation of cranking, and the delay permits the initial high current peaks drawn by the starter 18 to decay.

The processor means 28 repeats the sampling of the starter current for each cylinder. The MAGNITUDE signal is then correlated with the CYL CLOCK and CYLINDER #1 signals, such that starter current measurements are identified by cylinder.

The processor means 28 provides an OUTPUT signal, after data acquisition and manipulation, to the display means 30. The OUTPUT signal, in this preferred embodiment, includes a first component representative of the cylinders in firing order and a second component representative of the respective starter currents. The display means 30 displays the cylinder firing order and respective starter currents in aligned vertical columns, such that the operator can immediately identify a defective cylinder, or cylinders.

The firing order of the engine 12 could also be stored in a read-only memory of the processor means 28. The cylinders 14, 16 could then be listed by actual cylinder number in the firing order, e.g., 1, 3, 2, 4, for a typical four cylinder engine 12. In this embodiment, the cylinders are identified as 1, 2, 3 and 4 for the engine 12 shown, and the operator merely compares this listing with the firing order to identify each actual cylinder number.

If verification did not occur and the processor means 28 received a NO signal from the signal pre-processor 42, then the OUTPUT signal includes a third component representative of the lack of verification. In this preferred embodiment, the display means 30 displays the third component as a flashing asterisk above the aligned columns.

The processor means 28 continues to enable the engine kill means 32 for a predetermined period of time sufficient for data acquisition. The total period of enabling is preferably six seconds, and thereafter the engine kill means 32 is disabled and the engine 12, under normal conditions, will start. The preferred period substantially avoids damage and excessive wear to the starter motor 18 due to extended cranking.

A single preferred embodiment of the present invention has been described. It should be understood, however, that the true scope and spirit of the present invention is defined in the following claims, as interpreted in light of the foregoing specification.

What is claimed is:

1. An apparatus for measuring and displaying an indication of compression of an internal combustion engine by cylinder, said internal combustion engine including at least two cylinders, a primary coil and a starter motor operable by a starter current, one of said cylinders representing a reference cylinder, comprising, in combination:

input means, coupled to said engine, for producing a CYL CLOCK signal indicative of the firing of said primary coil and a CYLINDER #1 signal, indicative of the firing of said reference cylinder;

engine kill means, coupled to said engine, for controllably prohibiting the starting of said engine during cranking;

sample means, coupled to said starter, for measuring said starter current and generating a MAGNITUDE signal indicative thereof;

processor means for receiving said CYL CLOCK signal and said CYLINDER #1 signal, for activating said engine kill means, for intermittently receiving said MAGNITUDE signal, and for responsively providing an OUTPUT signal related to said MAGNITUDE signal; and display means, responsive to said OUTPUT signal, for displaying a first series of symbols identifying said cylinders by number and a second series of symbols indicating the respective comparison of said cylinders.

2. An apparatus as claimed in claim 1 wherein said processor means activates said engine kill means a predetermined time after cranking of said engine is initiated and continues activation thereof for a predetermined period.

3. An apparatus as claimed in claim 2 wherein said processor means intermittently receives said MAGNITUDE signal in accordance with said CYL CLOCK signal and during said predetermined period, whereby said starter current is sampled by said processor means in timed relationship with the firing of said primary coil.

4. An apparatus as claimed in claim 1 wherein said processor means, based upon said CYL CLOCK signal and said CYLINDER #1 signal, correlates said MAGNITUDE signal to said cylinders.

5. An apparatus as claimed in claim 1 wherein said input means includes a primary pick-up and a cylinder #1 pick-up.

6. An apparatus as claimed in claim 5 wherein said input means further includes a signal conditioning circuit and a signal pre-processor interposed said signal conditioning circuit and said processor means.

7. An apparatus as claimed in claim 1 wherein said input means further produces a DELAYED DWELL signal, related to said CYL CLOCK signal, said processor means intermittently receiving said MAGNITUDE signal in timed sequence with said DELAYED DWELL signal.

8. An apparatus as claimed in claim 7 wherein said DELAY DWELL signal is substantially identical to said CYL CLOCK signal delayed a predetermined time period.

9. An apparatus as claimed in claim 8 wherein said predetermined time period is has a magnitude in the order of 700 microseconds.

10. An apparatus as claimed in claim 7 wherein said sample means includes an amps probe, coupled to said starter, and a converter interposing said amps probe and said processor means.

11. An apparatus as claimed in claim 10 wherein said converter is coupled to said input means and converts in responsive to said DELAYED DWELL signal.

12. In a compression test apparatus of the type coupled to an engine wherein a starter current is monitored, said engine including a coil and a starter motor, an improved means for measuring said starter current comprising, in combination:

input means, coupled to said engine, for providing an input signal representative of the firing of said coil, said input signal being a DELAYED DWELL signal related to the firing of said coil; and sample means, coupled to said starter and said input means, for measuring said starter current in timed relationship to said input signal, whereby said starter current is intermittently sampled in accordance with the firing of said coil.

13. An improved means as claimed in claim 12 wherein said DELAYED DWELL signal represents a predetermined time after firing of said coil.

14. An improved means as claimed in claim 13 wherein said sample means measures said starter current in response to said DELAYED DWELL signal and at said predetermined time after firing of said coil.

15. In a compression test apparatus of the type coupled to an engine wherein a starter current is monitored, said engine including a coil and a starter motor, an improved means for measuring said starter current comprising, in combination:

input means, coupled to said engine, for providing an input signal representative of the firing of said coil;

sample means, coupled to said starter and said input means, for measuring said starter current in timed relationship to said input signal, whereby said starter current is intermittently sampled in accordance with the firing of said coil, said sample means providing a MAGNITUDE signal representative of said starter current, said sample means including an amps probe, coupled to said starter and providing an analog signal, and a converter, said converter producing said MAGNITUDE signal in response to said analog signal.

16. An improved means as claimed in claim 15 wherein said converter is coupled to said input means, said input signal triggering to conversion of said analog signal into said MAGNITUDE signal.

* * * * *